May 15, 1928.
L. E. LA BRIE
1,669,985
RETARDING MECHANISM
Original Filed July 25, 1925    2 Sheets-Sheet 2
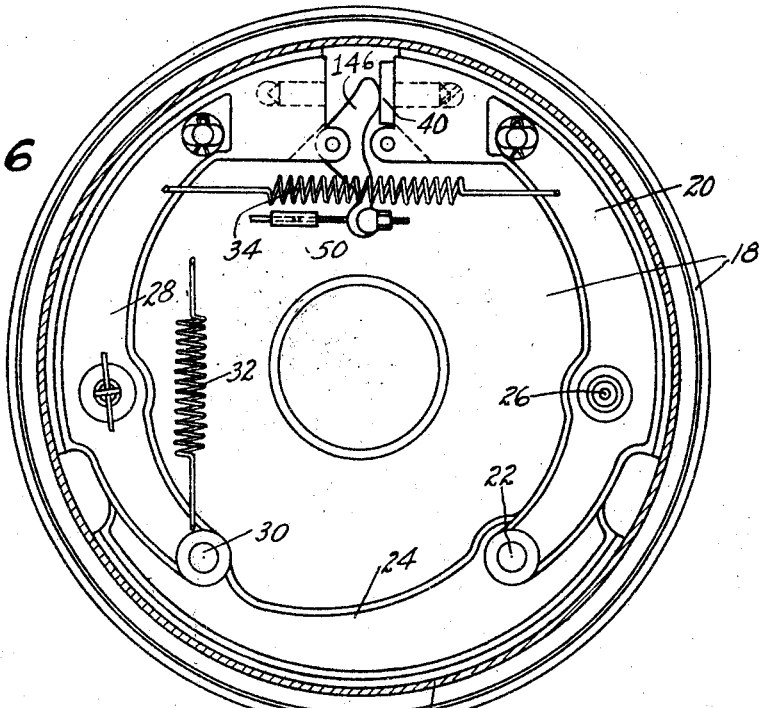
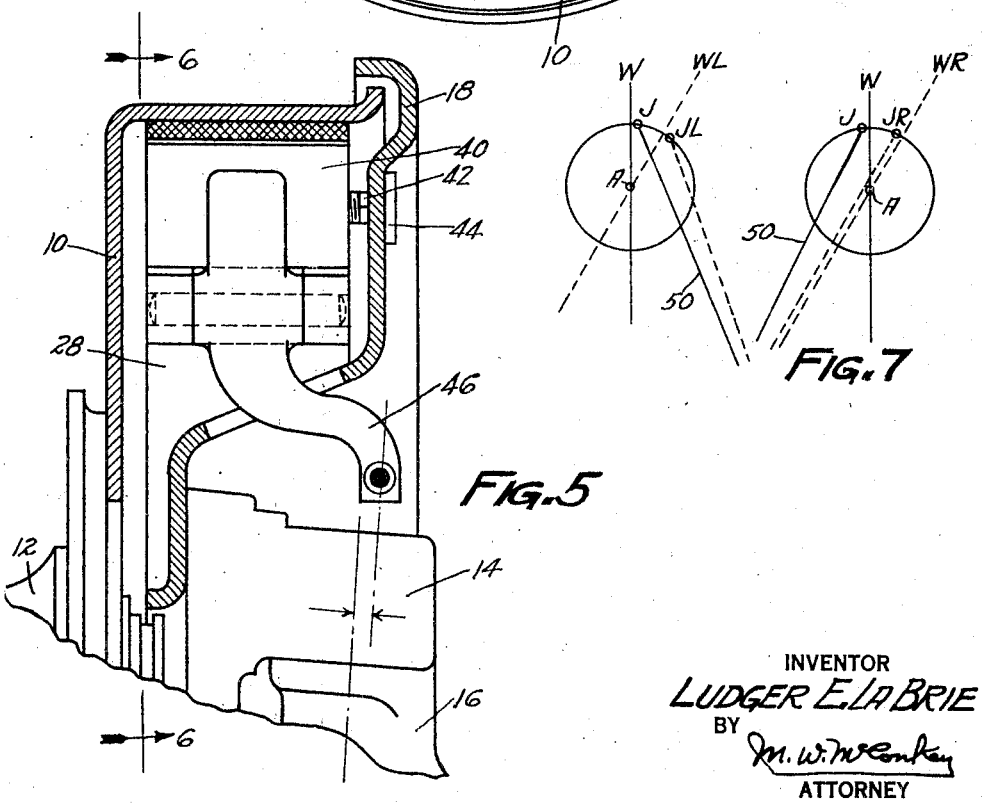
INVENTOR
LUDGER E. LA BRIE
BY
M. W. McConkey
ATTORNEY Patented May 15, 1928.

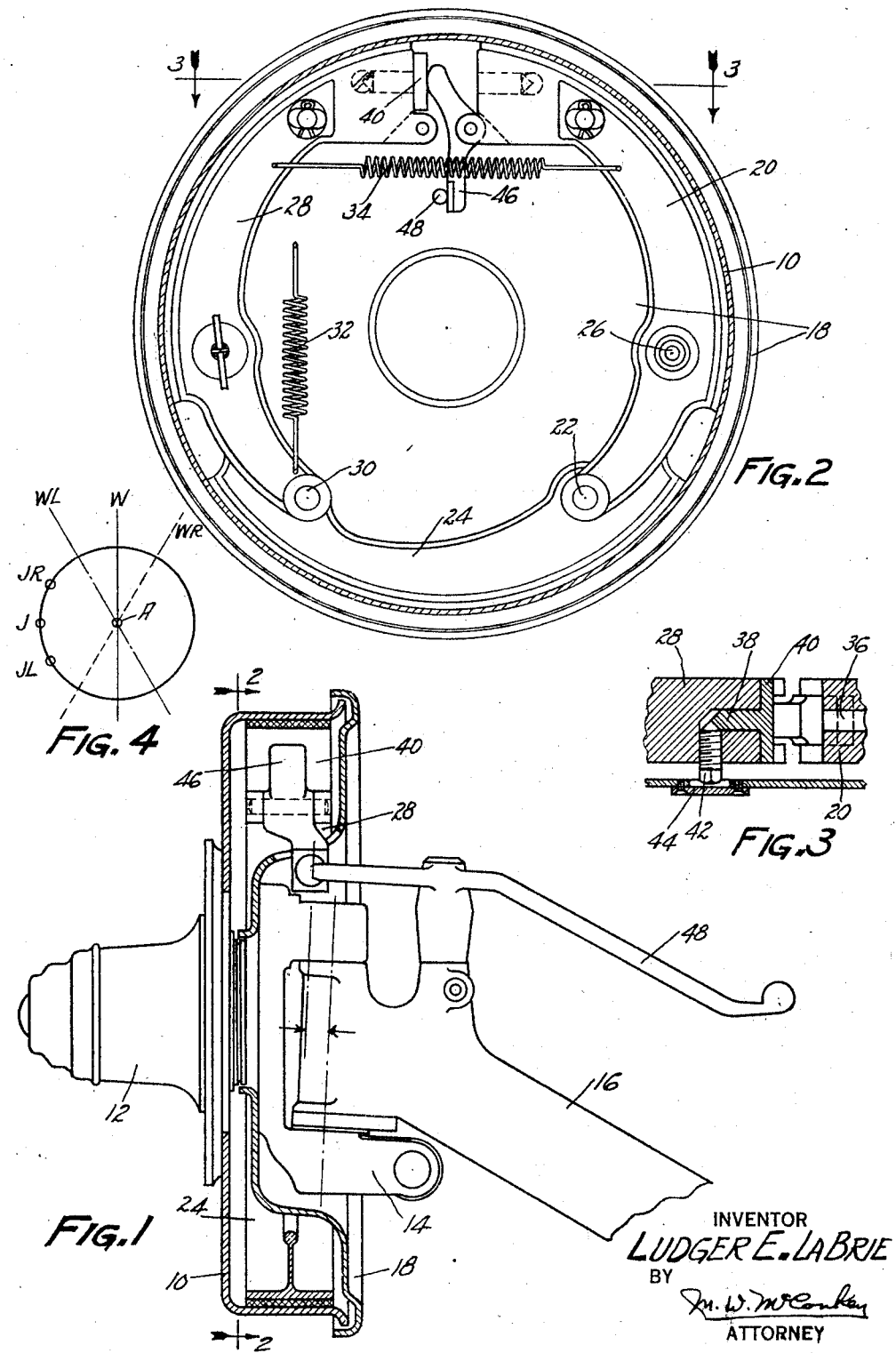

1,669,985

UNITED STATES PATENT OFFICE.

LUDGER E. LA BRIE, OF SOUTH BEND, INDIANA, ASSIGNOR TO BENDIX BRAKE COMPANY, OF CHICAGO, ILLINOIS, A CORPORATION OF ILLINOIS.

RETARDING MECHANISM.

Application filed July 25, 1925, Serial No. 46,030. Renewed November 16, 1927.

This invention relates to brakes, and is illustrated as embodied in brake mechanism for the swivelled wheel of an automobile. An object of the invention is to provide simple and easily adjustable connections and operating mechanism, various features relating to a novel adjustment of the wear plate, to the arrangement of a joint in the connections so that it moves substantially into the swivelling axis when the brake is applied, to the pivoting on one shoe end of a lever acting on an adjacent shoe, and to an optional arrangement for relieving the pressure on the outer brake on a turn.

These and various minor features, including novel combinations of parts and desirable particular constructions, will be apparent from the following description of the illustrative embodiments shown in the accompanying drawings, in which:

Fig. 1 is a vertical section through one front brake and adjacent parts;

Fig. 2 is a vertical section on the line 2—2 of Fig. 1, showing the shoes in side elevation;

Fig. 3 is a horizontal section on the line 3—3 of Fig. 2, showing the adjustment of the wear plate;

Fig. 4 is a diagram, corresponding to a top plan view on a greatly enlarged scale, and illustrating the action on a turn;

Fig. 5 is a vertical section corresponding to the top of Fig. 1, but illustrating a modification;

Fig. 6 is a vertical section through the modification on the line 6—6 of Fig. 5, showing the shoes in side elevation; and Fig. 7 is a diagram, corresponding to a top plan view of two of the modified brakes, and illustrating the action on a turn.

The brakes illustrated include drums 10, rotating with wheels the hubs of which appear at 12, and which are mounted on knuckles 14 swivelled in any desired manner to the ends of the front axles 16. Each knuckle 14 carries the backing plate 18 of its brake.

The brakes are both illustrated as Bendix three-shoe brakes, each including a reverse shoe 20 anchored at 22, a central shoe 24 anchored at 26, and a servo shoe 28 pivoted to shoe 24 at 30. Springs 32 and 34 urge the shoes away from the drum.

Each of the adjacent ends of shoes 20 and 28 is formed with a socket 36 for the stem 38 (Fig. 3) of a wear member 40, shown with a rectangular head, and with a threaded opening for an adjusting member such as a screw 42 having a conical end engaging a wedge surface on the end of stem 38, so that turning up on the screw forces wear member 40 in a direction lengthwise of the shoe. The screw 42 is accessible through an opening in the backing plate 18, which opening may be provided with a cover 44.

Wear member 40 is engaged by an expanding or prying device shown as a lever 46, pivoted intermediate its ends at the lower corner of shoe 20 (Fig. 2) or a lever 146 pivoted on shoe 28 (Fig. 6). When used on a front or other swivelled wheel, the lower end of lever 46 or 146 extends through an opening in backing plate 18 and is movable from an idle position spaced from the swivelling axis to an active position adjacent that axis. In the case of lever 46 (Figs. 1 and 2) the brake is applied by the thrust of the ball end of a horizontal lever 48 shown fulcrumed on the axle 16. In the case of lever 146 (Figs. 5 and 6), the brake is applied by a cable or other tension member 50 directly and universally jointed to the bottom of the lever, i. e., within half an inch or so, and directly in the axis if no change in the braking pressure is desired when the wheel is swivelled.

I prefer to provide both shoes 20 and 28 with sockets 36 and with lugs to receive the pivot or lever 46 or lever 146. This not only permits making shoes 20 and 28 interchangeable, but permits use of either the "crank-and-lever" or "crank-and-cable" control with the same brake.

When it is desired to arrange the brake of Figs. 1 and 2 so that the pressure will be relieved when it is on the outside of a turn, the joint between levers 48 and 46 is not in active position exactly in the swivelling axis, but slightly at one side of that axis. The arrangement is shown on an enlarged scale diagrammatically in Fig. 4, wherein the center A represents the swivelling axis, the wheel is some distance off of the left in a plane parallel to the line W when the vehicle is running straight ahead, and the joint between the levers is at J.

If now the wheel is swivelled to a position parallel to the line WR, which places it on the outside of the turn, J tends to move to JR,—lever 46 moves away from lever 48, thus relieving the pressure on the brake. If the wheel is swivelled to a position parallel to WL, on the inside of the turn, J tends to move to JL,—i. e., lever 46 crowds against lever 48 to tighten the brake. It will be observed that the brakes should not be equalized when this differential action is desired.

When this sort of differential action is desired with the brake of Figs. 5 and 6, the connections are not equalized, and the parts are arranged as in Fig. 7. The wheels when straight ahead are parallel to lines W through the swivelling axes A, the joints between levers 146 and tension members 50 at this time being in the positions J, on the opposite sides of axes A from the wheels and preferably in front of the axes.

If now the wheels are swivelled to round a corner to the right, parallel to lines WL and WR, joints J are swung to the corresponding positions JL and JR. It will be seen that the arc J—JL has a considerable component in the direction of the tension on member 50, and therefore substantially relaxes the pressure on the brake, whereas arc J—JR is more nearly at a right angle to its member 50, and therefore increases very slightly the tension on the inner brake. If each member 50 were tangent to its circle at the point J, swivelling the wheels would tighten the inner brake as much as it would relieve the outer brake. On the other hand, if each member 50 extended diametrically of the circle to reach its point J,—i. e., if it intersected the axis A, swivelling the wheels would slightly relieve the pressure on both front brakes. By selecting a suitable compromise position such as the one shown, approximately midway between the tangent and the diametric positions, a substantial relief of the outer brake is secured with a comparatively small tightening of the inner brake.

I claim:

1. Braking mechanism for a swivelled wheel comprising, in combination, a brake swivelling with the wheel, an operating lever for the brake swivelling with the wheel and fulcrumed for movement about a substantially horizontal axis, and a tension member connected to the lever by a joint moving as the lever swings in applying the brake from an idle position spaced forwardly of the swivelling axis rearwardly toward that axis.

2. Braking mechanism for a swivelled wheel comprising, in combination, a brake swivelling with the wheel, an operating lever for the brake swivelling with the wheel and fulcrumed for movement about a substantially horizontal axis, and a tension member connected to the lever by a joint moving as the lever swings in applying the brake from an idle position spaced forwardly of the swivelling axis rearwardly to an active position slightly at one side of the axis, the active position of the joint being such that swivelling the wheel to round a corner with the wheel on the outside of the turn moves the joint with a component in the direction of the tension on said member to relax the pressure on the brake.

3. Braking mechanism for a swivelled wheel comprising, in combination, a brake for the wheel having adjacent oppositely-movable shoe ends, a lever fulcrumed on one shoe end and engaging the other shoe end and having an operating part movable in applying the brake from an idle position spaced forwardly of the swivelling axis rearwardly toward that axis, and a tension member connected to said part of the lever.

4. Braking mechanism for a swivelled wheel comprising, in combination, a brake for the wheel having adjacent oppositely movable shoe ends, a lever fulcrumed on one shoe end and engaging the other shoe end and having an operating part movable in applying the brake from an idle position spaced forwardly of the swivelling axis rearwardly to an active position slightly at one side of that axis, and a tension member connected to said part of the lever, the active position of the joint between said lever and member being so arranged that swivelling the wheel to place it on the outside of a turn will swing the joint in a direction to relax the tension on said member.

5. Braking mechanism for a swivelled wheel comprising, in combination, a brake for the wheel having adjacent oppositely-movable shoe ends, a lever pivoted intermediate its ends on one shoe end and engaging with one of its ends the other shoe end, the other end of the lever being movable to pry the shoes apart from an idle position spaced from the swivelling axis toward that axis, and a member engaging said other end of the lever and operating the lever to apply the brake.

6. Braking mechanism for a swivelled wheel comprising, in combination, a brake for the wheel having adjacent oppositely-movable shoe ends, a lever pivoted intermediate its ends on one shoe end and engaging with one of its ends the other shoe end, the other end of the lever being movable to pry the shoes apart from an idle position spaced from the swivelling axis to an active position slightly at one side of that axis, and a member engaging said other end of the lever and operating the lever to apply the brake, the active position of the joint between the lever and said member being so arranged with respect to the swivelling axis that swivelling the wheel to place it on the outside of a turn automatically relieves the pressure on the brake.

7. Braking mechanism including a drum, shoes within the drum having adjacent ends, both said ends being formed for pivotally supporting a lever arranged to pry the shoes apart, in such a manner that a lever may be mounted on one shoe and be operated by a thrust on its end or may be mounted on the other shoe and be operated by tension on its end, in combination with a lever pivotally mounted on one of said shoes and engaging the other shoe as described.

8. Braking mechanism including a drum, interchangeable shoes within the drum having adjacent ends, both said ends being formed for pivotally supporting a lever arranged to pry the shoes apart, in combination with a lever pivotally mounted between its ends on one of said shoes and engaging the other shoe as described.

9. Braking mechanism comprising, in combination, a drum, a backing plate, shoes between the drum and backing plate, a device for forcing one shoe end toward the drum, a wear member on said shoe end engaged by said device, and means operable from outside the drum and backing plate for adjusting the wear member lengthwise of the shoe.

10. Braking mechanism comprising, in combination, a drum, a backing plate, shoes between the drum and backing plate, a device for forcing one shoe end toward the drum, a wear member on said shoe end engaged by said device, and an adjusting part accessible from outside the drum and backing plate for wedging the wear member lengthwise of the shoe.

11. Braking mechanism comprising, in combination, a drum, a backing plate, shoes between the drum and backing plate, a device for forcing one shoe end toward the drum, a wear member on said shoe end engaged by said device, and a laterally-extending adjusting device carried by the shoe and accessible through the backing plate and operable to adjust the wear member lengthwise of the shoe.

12. Braking mechanism comprising, in combination, a drum, a backing plate, shoes between the drum and backing plate, a device for forcing one shoe end toward the drum, a wear member on said shoe end engaged by said device, and a laterally-extending adjusting device threaded into said shoe end and accessible through the backing plate and operable to wedge the wear member lengthwise of the shoe.

13. Braking mechanism comprising, in combination, a drum, a backing plate, shoes between the drum and backing plate, a device for forcing one shoe end toward the drum, a wear member having a part extending into a socket in the shoe end lengthwise of the shoe, and means operable through the backing plate and through the side of the shoe to wedge the socket part of said member outwardly.

14. Braking mechanism comprising, in combination, a drum, a backing plate, shoes between the drum and backing plate, a device for forcing one shoe end toward the drum, a wear member having a part with a wedge end extending into a socket in the shoe end lengthwise of the shoe and a conical-ended wedging screw threaded through the side of the shoe into the socket to wedge the socket part of said member outwardly.

15. A brake shoe having a socket in its end for the stem of a wear member, and a threaded opening intersecting the bottom of the socket for a conical-ended wedging screw.

16. A brake comprising, in combination, a retarding member, and a floating adjustment carried by said member and including a member extending crosswise of the retarding member and formed with a conical wedging surface.

17. A brake comprising, in combination, a retarding member, and a floating adjustment carried by said member adjacent one end and including an adjustable wedge member.

18. A brake friction member having an applying device adjacent its end, a thrust part carried by the friction member and engaged by the applying device, and a member carried by the friction member and extending transversely of the friction member and which is adjustable to wedge the thrust part lengthwise of the friction member.

19. A brake friction member formed with a recess at its end and having an applying device adjacent said end, a thrust part carried by the friction member and engaged by the applying device and having a portion extending lengthwise of the shoe into said recess, and a member carried by the friction member and extending crosswise of said recess into engagement with the lengthwise-extending portion of said part and which is adjustable to wedge the thrust part lengthwise of the friction member.

20. A brake friction member having a thrust part adjacent one end, in combination with an adjusting device acting to wedge the thrust part lenghwise of the friction member and which is arranged crosswise of the friction member and which includes a threaded part which is turned to make the adjustment.

21. A brake friction member having a thrust part adjacent one end, in combination with an adjusting device acting to wedge the thrust part lengthwise of the friction member and which includes a threaded part which is turned to make the adjustment.

22. A brake friction member having a thrust part movable lengthwise of the shoe and an adjusting device movable crosswise of the shoe and operating the thrust part.

23. A brake friction member having a recess in its end and an opening crosswise of the shoe, in combination with a thrust member having a stem extending into said recess, and an adjusting device arranged in the crosswise opening, and having a part moved crosswise of the shoe and which part is formed with a wedge surface engaging said stem.

24. A brake friction member having a recess in its end and an opening crosswise of the shoe, in combination with a thrust member having a stem extending into said recess, and an adjusting device arranged in the crosswise opening, and having a part moved crosswise of the shoe and which part is formed with a wedge surface engaging said stem, said device having a part which is threaded and which is turned to cause the movement crosswise of the shoe and the wedging of said stem.

In testimony whereof I have hereunto signed my name.

LUDGER E. LA BRIE.